(12) United States Patent
Inoue et al.

(10) Patent No.: US 6,981,633 B2
(45) Date of Patent: Jan. 3, 2006

(54) POINT OF SALES TERMINAL, POINT OF SALES SYSTEM, AND METHOD FOR MANAGING CASH-ON HAND INFORMATION

(75) Inventors: Kaoru Inoue, Nishitokyo (JP); Shigeki Enoki, Tama (JP)

(73) Assignee: Fujitsu Limited, Kawasaki (JP)

( * ) Notice: Subject to any disclaimer, the term of this patent is extended or adjusted under 35 U.S.C. 154(b) by 764 days.

(21) Appl. No.: 09/947,533

(22) Filed: Sep. 7, 2001

(65) Prior Publication Data

US 2002/0030101 A1    Mar. 14, 2002

(30) Foreign Application Priority Data

Sep. 14, 2000  (JP) .............................. 2000-279139

(51) Int. Cl.
*G07G 1/00* (2006.01)
(52) U.S. Cl. ........................ 235/7 R; 235/10; 235/22; 705/16
(58) Field of Classification Search ............. 235/6–28, 235/7 R, 7 A; 705/16–25
See application file for complete search history.

(56) References Cited

U.S. PATENT DOCUMENTS 6,067,530 A * 5/2000 Brooks et al. ................ 705/30
6,772,941 B1 * 8/2004 Carter ........................ 235/7 R

FOREIGN PATENT DOCUMENTS

JP        S61-74096        4/1986

* cited by examiner

*Primary Examiner*—Richard Chilcot
(74) *Attorney, Agent, or Firm*—Staas & Halsey LLP

(57) ABSTRACT

Cash received from a customer is placed by cashier into a change device, which is connected to a point of sales terminal. The change device counts an amount of cash by its type, and stores a counted amount into a memory unit. Further the change device stores an amount of change that discharged from the change device. The amount of cash stored in the memory unit is sent to the point of sales terminal and to a server. The server contains cash-on-hand table, and by receiving the amount of cash from the point of sales terminal, the server updates the cash-on-hand table. The cash-on-hand table is used to determine whether any of the point of sales terminal needs cash to be supplemented or not.

15 Claims, 13 Drawing Sheets

FIG.9

(a) | POS(1) | Ca(j) | D(1) | M(1) |

(b) | POS(1) | Ca(j) | D(n) | M(n) |

(c) | POS(2) | Ca(i) | D(m) | M(m) |

(d) | POS(2) | Ca(j) | D(m) | M(m) |

(e) | POS(2) | Ca(j) | D(m+L) | M(m+L) |

Fig.11

| | TOTAL | 10,000 | 5,000 | 1,000 | 500 | 100 | 50 | 10 | 5 | 1 |
|---|---|---|---|---|---|---|---|---|---|---|
| POS-3a | 830,210 | 60 | 21 | 90 | 50 | 73 | 38 | 61 | 61 | 95 |
| | | | | 10 | | 27 | 62 | 39 | 39 | 5 |
| POS-3b | 926,406 | 73 | 13 | 102 | 30 | 95 | 76 | 80 | 41 | 101 |
| | | | 7 | | 20 | 5 | 24 | 20 | 59 | |
| POS-3c | 542,369 | 41 | 7 | 73 | 26 | 60 | 86 | 50 | 101 | 64 |
| | | | 13 | 27 | 24 | 40 | 14 | 50 | | 36 |
| POS-3d | 548,100 | 35 | 8 | 140 | 17 | 39 | 90 | 55 | 109 | 105 |
| | | | 12 | | 23 | 61 | 10 | 45 | | |
| POS-3e | 1,054,375 | 88 | 11 | 83 | 50 | 91 | 25 | 63 | 63 | 80 |
| | | | 9 | 17 | | 9 | 75 | 27 | 27 | 20 |
| ... | ... | ... | ... | ... | ... | ... | ... | ... | ... | ... |
| POS-3n | 1,033,898 | 91 | 5 | 66 | 52 | 23 | 70 | 69 | 65 | 83 |
| | | | 15 | 34 | | 77 | 30 | 31 | 35 | 17 |
| | ... | ... | ... | ... | ... | ... | ... | ... | ... | ... |
| subtotal | 27,647,914 | 2,451 | 125 | 2,150 | 473 | 704 | 851 | 812 | 882 | 934 |
| CASH COUNTER | 16,215,148 | 1,420 | 83 | 763 | 763 | 799 | 459 | 791 | 791 | 1,083 |
| TOTAL | 43,863,062 | 3,871 | 208 | 3,251 | 1,236 | 1,503 | 1,310 | 1,673 | 1,673 | 2,017 |

Fig.12

| CASHIER | CASH IN CHANGE MACHINE | CASH IN DRAWER | GIFT CERTIFICATES |
|---|---|---|---|
| Ca(1) | 123,065 | 65 | 6,000 |
| Ca(2) | 154,278 | 150 | 7,000 |
| ⋮ | ⋮ | ⋮ | ⋮ |
| Ca(n) | 109,391 | 200 | 13,000 |

POINT OF SALES TERMINAL, POINT OF SALES SYSTEM, AND METHOD FOR MANAGING CASH-ON HAND INFORMATION

CROSS REFERENCE TO RELATED APPLICATIONS

This application claims priority to number 2000-279139 filed Sep. 14, 2000 in Japan, the contents of which are incorporated herein by reference.

BACKGROUND OF THE INVENTION

1. Field of the Invention

The present invention relates to a point of sale (POS herein after) system and POS terminal device which executes change management during the purchase of goods and services. In addition, the present invention relates to a method for managing cash-on-hand information for such a POS terminal or a POS system.

2. Description of the Related Art

In retail stores using conventional POS systems, various types of cash management are performed. For example, the following operations are performed in such stores during business hours.

1) Preparing cash for change;
2) Inputting amount of cash for change at POS terminal;
3) Handling payment from customer, and inputting the amount of handled cash;
4) Handling change to customers;
5) Totaling a cash amount that should be in a drawer of a POS terminal;
6) Totaling a cash amount that is actually in the drawer;
7) Calculating discrepancies between cash which should be in the drawer and cash actually in the drawer;
8) Collecting exceeded cash in the drawer;
9) Receiving daily profit; and
10) Depositing profits to bank.

Stores need to prepare cash, particularly cash of small denominations, to be handed to customers as change at each POS terminal in the stores. Although it is possible to replenish change by cash received from customers, there are some cases where prepared change becomes insufficient during business hours, particularly with regard to certain denominations of currency. It is therefore necessary to perform appropriate change supplementation.

On the other hand, there are also some large denominations of currencies that will not be handed to customers as change. These bills must be withdrawn from circulation while the store is in operation.

In addition, at changes in personnel shifts, or at closing time, theoretical amount of cash that should be in a drawer and the actual amount of cash remaining in a drawer of each POS terminal will be compared. If any discrepancy between these amounts occurs, a cause of this discrepancy will be investigated.

In particular, conventionally, the probability for occurrence of the following problems is very high.

Firstly, it is necessary for stores to deposit money suitable for change into financial institutions beforehand. Cash prepared for change held by stores is not freely operable by the stores. Therefore, it is desirable for stores to reduce the amount of cash held for change as much as possible.

Secondly, work for preparing change at the bank is time-consuming. In particular for use as change, cash, especially coins, must be sorted by its type, and work must be performed such as organizing as per number of type. In recent years, financial institutions have been applying a charge for a preparation of change, as the preparation of change is time-consuming. This charge is generally a fixed proportion, for example a few percent of the amount handled. However, in stores where it is necessary to prepare several million yen in change each day, the charging fee paid over the year will also be in the millions of yen, creating a problem of greater burdens on the store.

Thirdly, the preparation of the change itself is a heavy labor.

To prepare cash for change, it is necessary for a store to get cash from a financial institution, such as bank. Assuming a store employee goes the financial institution and gets cash, a time in moving back and forth between the financial institution and the store will amount to at least several tens of minutes. As this period of time must also be considered as working time for employees, wages must be paid.

Now, consider an example of the costs needed in change preparation work for five stores, two employees are in charge of getting cash for each store, and they would spend 30 minutes going back and forth between the store and the financial institution. If employees are paid an hourly wage of 2,000 yen, and assuming the store operates for 300 days a year, an expense of 3 million yen is needed for five stores just for change preparation.

In addition, it is necessary to prepare cash received from a financial institution for each terminal device in each store prior to opening. Assume that this operation would also need two employees per store, and the work time to be 45 minutes. If the hourly wage for employees in each of the five stores is 1,500 yen, then 4 million yen will be needed just for cash preparation during the year.

Furthermore, the nature of a situation is such that not only change should be supplemented at the opening of the store, but must also be supplemented during the business hours as needed. In particular, small denominational currency tends to be handed out to customers as change more often than it is taken in from customers. As the probability of these coins or bills becoming insufficient during business is extremely high, there are cases where change must be supplemented several times a day.

On the other hand, certain kinds of bills, for example 10,000-yen bill, will be accepted from customers, but will not be used for change, as it is the largest bill. Therefore, these bills will accumulate in a drawer during transactions. As well as for security reason, it is necessary to withdraw such bills from circulation when appropriate during business hours.

In this way the supplementing and withdrawal from circulation of cash during business hours is irksome.

Further, after business hours, cash in the store, that is to say all of the earnings, will be taken to a financial institution. This situation requires the same manpower as obtaining cash for change.

Finally, the timing of change supplementation and removal of cash from circulation is difficult to determine.

If it is not possible to ascertain a cash situation at each POS terminal on a real time basis, then it is not possible to determine which POS terminal needs a change supplement. Further, it is hard to determine what sort of and how much bill or coin needs to be supplemented, or whether large denomination bills need to be taken out of circulation. Therefore, it is very probable that change supplements will not come in time, or conversely that unneeded supplemental work will occur.

SUMMARY OF THE INVENTION

The present invention solves the above-mentioned problems of the related art.

An aspect of the present invention is to provide a point of sales system that is capable of determining the amount of cash remaining within terminals, to supplement cash to or correct cash from terminals timely.

To solve the aforementioned problems of the related art, the point of sales terminal of the present invention calculates a discrepancy between amount of cash before a transaction and amount of cash after said transaction is completed, and sends the result of the calculation to an upper level device, such as a host computer, which is connected to the terminal through an interface unit.

The point of sales terminal of the present invention may comprise a change device capable of storing cash for change and discharges appropriate amount of change, and the point of sales terminal receives information regarding amount of cash discharged as change from the change device.

Further, the aforementioned problems of the related art are solved by a point of sales terminal of the present invention that comprises a change unit accepting cash received from a customer and discharging change to be handed to customer. The change device includes a storage area for storing cash that is prepared for change, and a unit counting an amount of cash by each money type, and a processor of the point of sales terminal calculating discrepancy of an amount of cash before and after a transaction is completed. This information may be sent to an upper level device that is connected to the point of sales terminal.

More particularly, the point of sales terminal calculates and sends cash discrepancy each time a transaction is completed.

Moreover, amount of cash that is not accepted by the change unit, or coupons that cannot be accepted by the change unit, is input from an input unit of the point of sales terminal of the present invention by a cashier. Then the discrepancy in the coupons before and after a transaction is calculated.

Further, when a request from the upper level device is received, the point of sales terminal of the present invention requests the change unit to send cash-on-hand information, then sends received information to the upper level device.

Moreover, the point of sales terminal of the present invention receives information regarding a cash-on-hand table from the upper level device. The received cash-on-hand table is displayed on a display unit of the point of sales terminal of the present invention.

Meanwhile, the aforementioned problems are solved by an information device including a memory unit storing a cash-on-hand table containing cash-on-hand information of each lower level terminal connected to the information device.

More particularly, the information device updates the cash-on-hand table by using information regarding cash discrepancy received from lower level terminals such as a point of sales terminal. The cash-on-hand table may be output through an output means. The output cash-on-hand table may contain information regarding the amount of cash remaining in each lower level terminal, and the amount of cash which needs to be supplemented to fulfill a basic amount, especially by each of money type.

On the other hand, the aforementioned problems are solved by recording a difference between an amount of cash received from and an amount of cash discharged to a customer everytime a transaction is completed, accumulating the difference of one transaction with the difference of cash of the previous transactions, reporting the accumulated difference to an upper level device (host computer) with an identifying information of a terminal, and gathering the reported accumulated difference.

Especially, the difference between amount of cash within a terminal and a basic amount of cash which has to be in the terminal is calculated, and then output. The calculation of the difference may be operated every time a transaction is completed, or may be operated when a request for such calculation is received from outside.

Further, a device of the present invention, in which is capable of handling change to be given to customers, comprises a storage storing cash prepared for change, a sorter which determines types of cash thrown into said device and sorts cash by determined types, a counter that counts cash thrown into and discharged from the device by each type, a memory unit which records a difference between an amount of cash thrown into and discharged from said device. The information recorded in the memory unit is sent to the other device. The other device may be a point of sales terminal.

Particularly, the information recorded in the memory unit is output when the device receives a request from the other device.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 9 is a diagram showing an example of an electronic messages transmitted from a point of sales terminal to a store server.

FIG. 11 is a diagram showing an example of a cash-on-hand table of an embodiment of the present invention.

FIG. 12 is a diagram showing an example of a table containing information regarding amounts of cash and gift certificates handled by each cashier.

DESCRIPTION OF THE PREFERRED EMBODIMENT

A form of a preferred embodiment of the present invention will be described by using the following figures.

Figure 1:
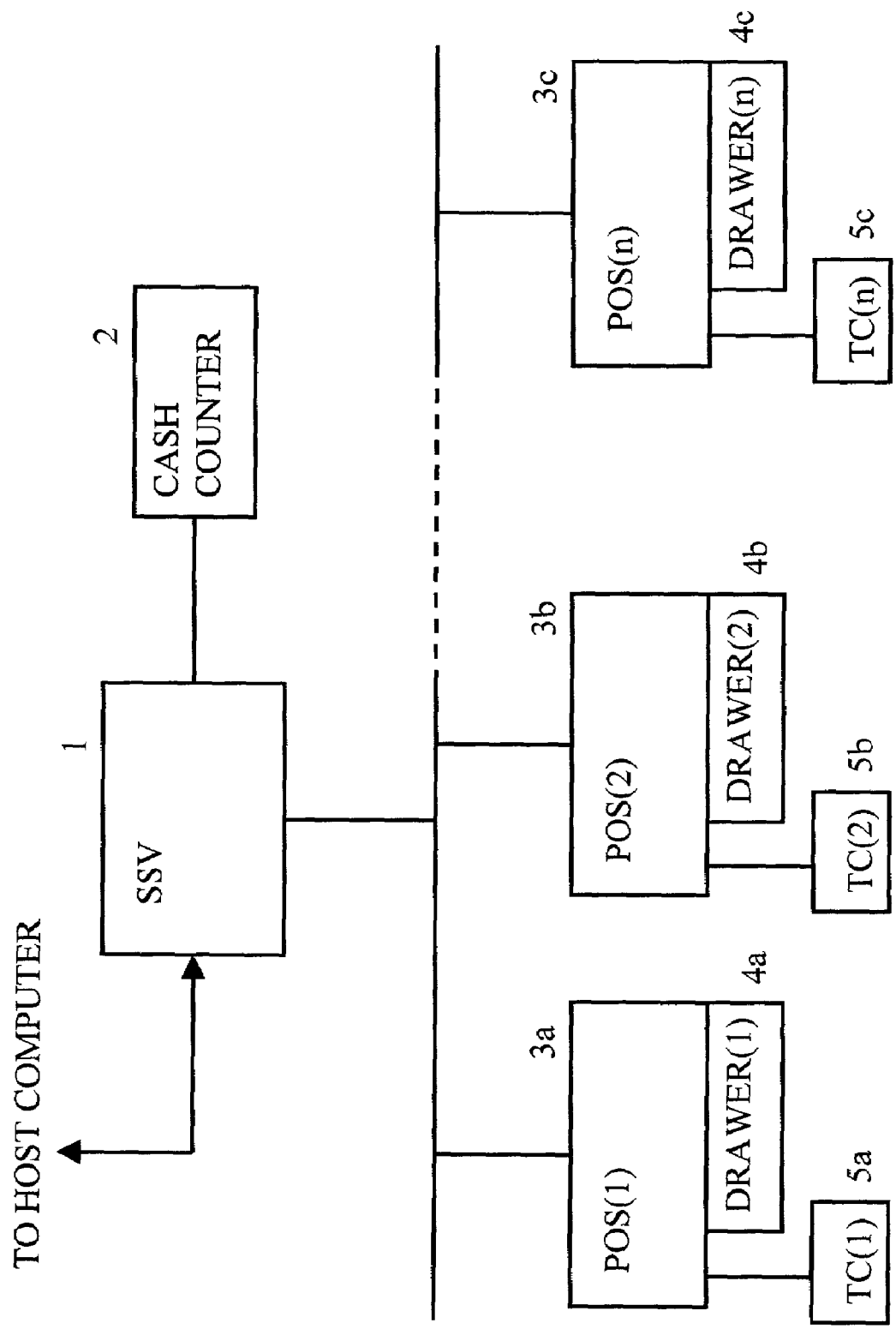
FIG. 1 is a block diagram of a point of sales system according to an embodiment of the present invention.

FIG. 1 is a block diagram of POS system according to the present embodiment. This embodiment shows an example of the point of sales system used in a supermarket, etc. The POS system shown in FIG. 1 comprises a storage server (hereafter SSV) 1, a cash counter 2, POS terminal 3a, 3b, 3c, and change machine (hereafter TC) 5a, 5b, 5c.

SSV 1 is connected to an upper level device, such as a host computer, that is not shown in FIG. 1. Further, SSV 1 is connected to cash counter 2, as well as a plurality of POS terminal 3a, 3b, 3c. Each of TC 5a, 5b, 5c is connected to POS terminal 3a, 3b, 3c respectively. Further, drawer 4a, 4b, 4c will be set to each POS terminal 3a, 3b, 3c.

Figure 2:
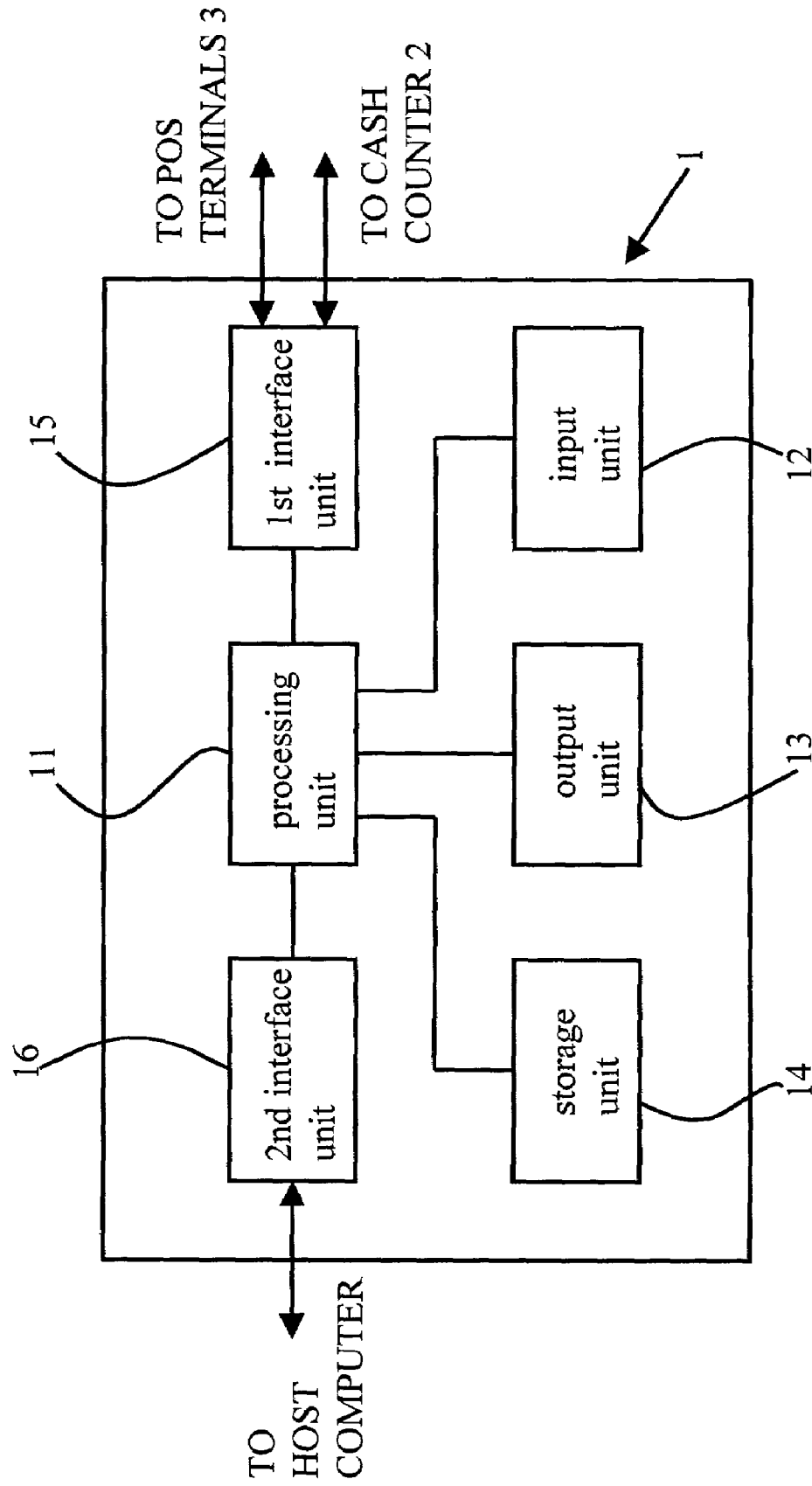
FIG. 2 is a schematic diagram showing an example of storage server of one of the present invention.

FIG. 2 shows a schematic diagram of SSV 1. SSV 1 includes a processing unit 1, which is connected to input unit 12 such as keyboard, output unit 13 such as display unit or printer unit, and storage unit 14. Storage unit stores a cash-on-hand table, which will be described in detail later. SSV 1 also has a first interface unit 15 to be connected to POS terminals 3 and cash counter 2, which are lower level devices, and a second interface unit 16 to be connected to host computer.

Figure 3:
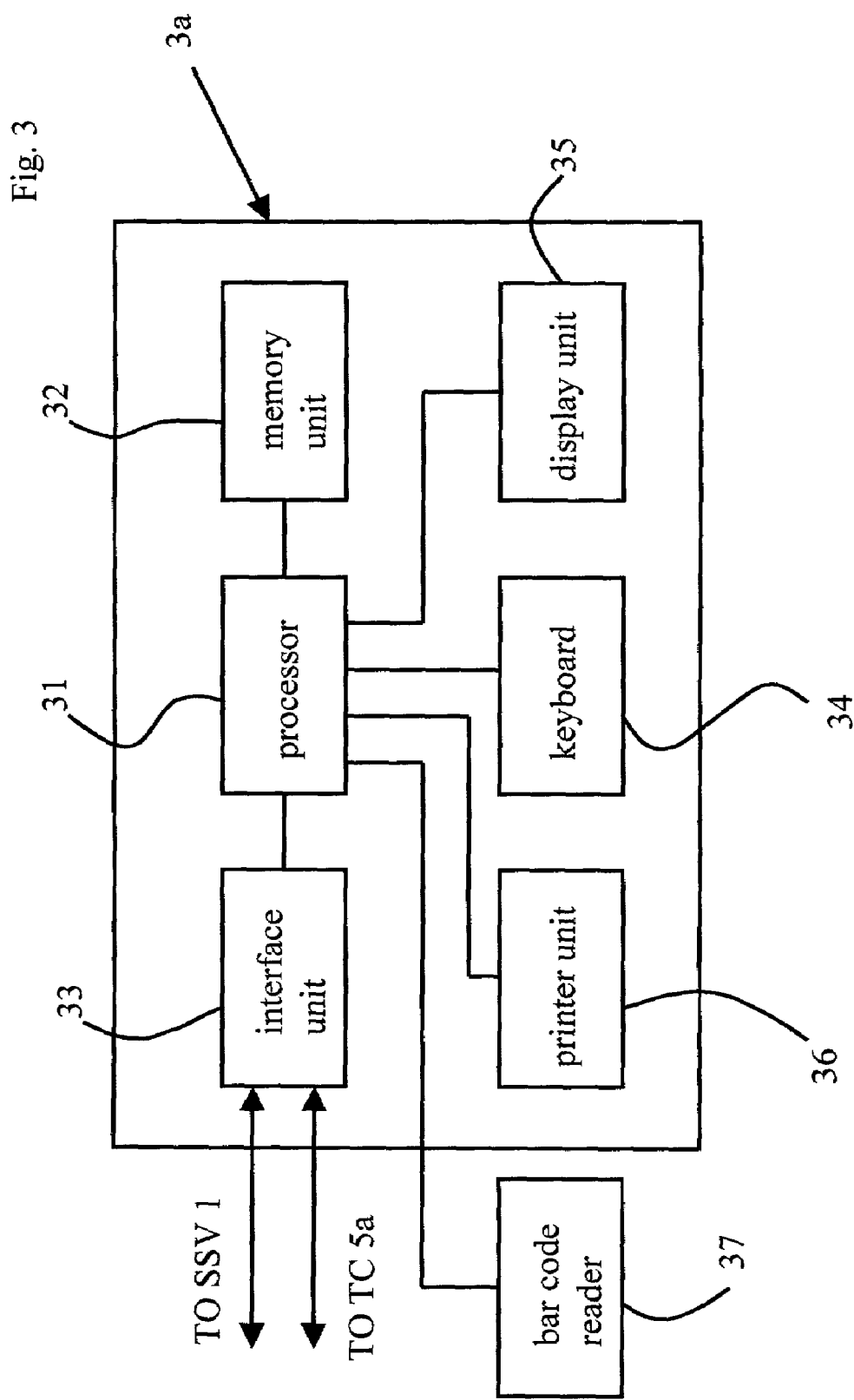
FIG. 3 is a schematic diagram showing an example of point of sales terminal of the present invention.

FIG. 3 shows a schematic diagram of POS terminal 3a of the present embodiment. POS terminal 3a comprises a processor 31, a memory unit 32 to store software for operations as well as data to be used or made during transactions, and an interface unit 33 that is connected to SSV 1 and TC 5a. Also, POS terminal 3a comprises keyboard 34 used to input a variety of information manually, a display unit 35, a printer unit 36 to print receipts, and a bar code reader 37 to read bar codes attached to products. POS terminal 3a may have a card reader for reading a card such as credit card or member card.

Each cashier using POS terminal 3a has his or her own drawer 4a, and sets it to POS terminal 3a when he or she is in operation. Further, each cashier brings his or her own drawer 4a to cash counter 2 at the appropriate time if there is cash in POS terminal 3a, and the cash within the drawer 4a is accepted into the cash counter 2.

Figure 4:
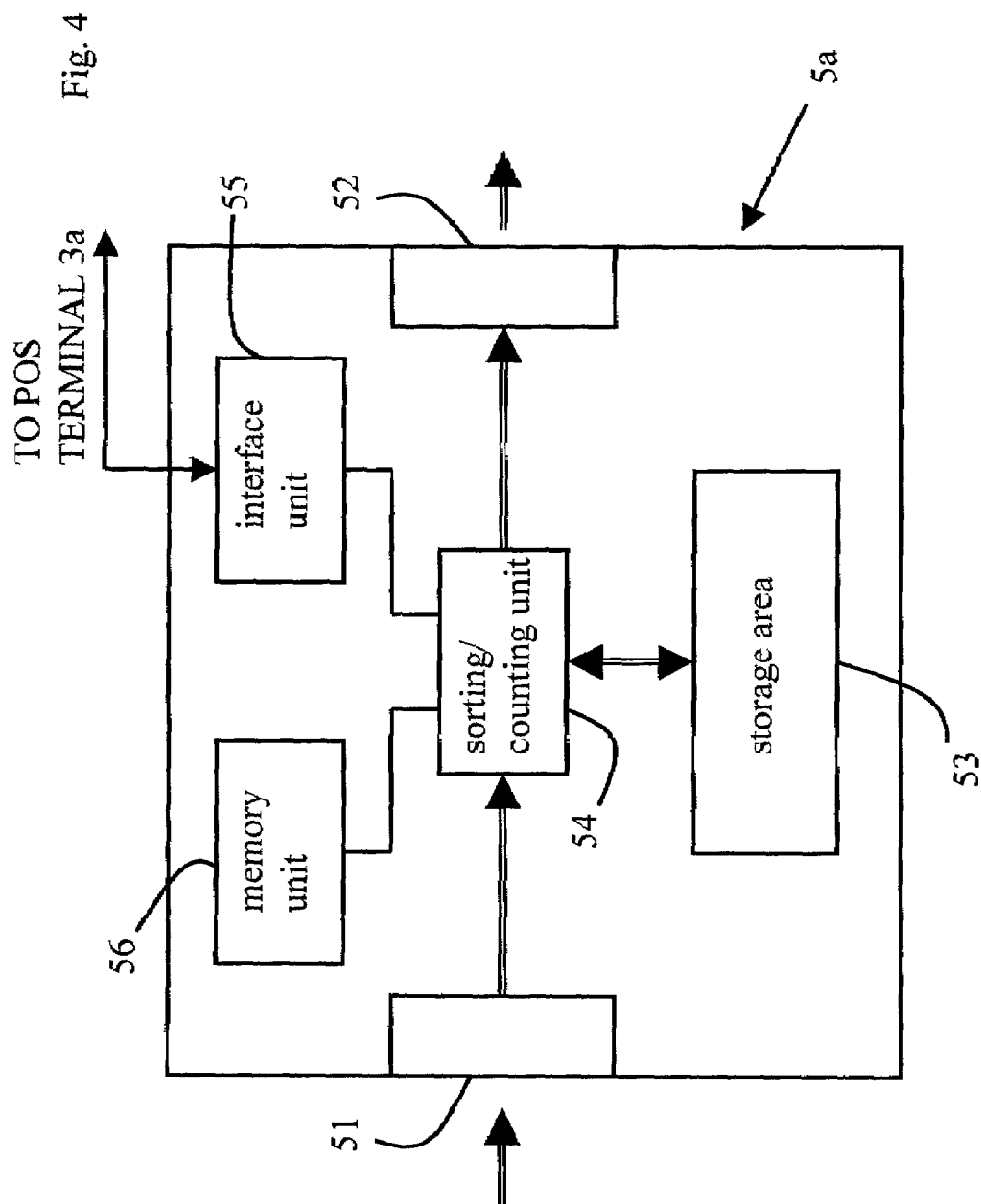
FIG. 4 is a schematic diagram showing an example of change machine of the present invention.

FIG. 4 shows a schematic diagram of TC 5a of the present embodiment. TC 5a is connected to POS terminal 3a through interface unit 55. TC 5a sends cash-on-hand information to POS terminal 3a when a request from POS terminal 3a is received. Further, TC 5a receives information regarding a transaction, for instance a total amount of the transaction, or an amount of change to be discharged, to discharge an appropriate amount of change.

In FIG. 4, flows of cash accepted into, and discharged from, TC 5a are shown in arrows with doubled lines. As explained above, TC 5a stores cash that should be handed over to customers as change in a storage area 53. Cash stored in storage area 53 is sorted by its type. When a customer makes payment, cashier places cash received from customer into TC 5a from money slot 51. Sorting/counting unit 54 determines type of cash that placed into TC 5a, and counts an amount of cash for each type. The result of this count will be recorded to a memory unit 56. This information recorded in memory unit 56 is used as a base of cash-on-hand information. Meanwhile, sorted and counted cash is then added to the cash stored in storage area 53.

When a transaction is settled, a total amount of transaction is sent to TC 5a from POS terminal 3a. With this information and a total amount of cash placed into TC 5a, an appropriate amount of change is calculated, and is discharged from dispenser 52.

If cash placed into TC 5a cannot be counted by, or sorting/counting unit 54 cannot determine cash type, such cash is rejected from dispenser 52. In such case, cash will be accepted within drawer 4a, and its amount may be input manually by a cashier from the keyboard of the POS terminal 3a or any other means.

Although POS terminal 3a and TC 5a are described as separate devices in this embodiment, it is possible to consider that those devices form a single terminal practically.

Figure 5:
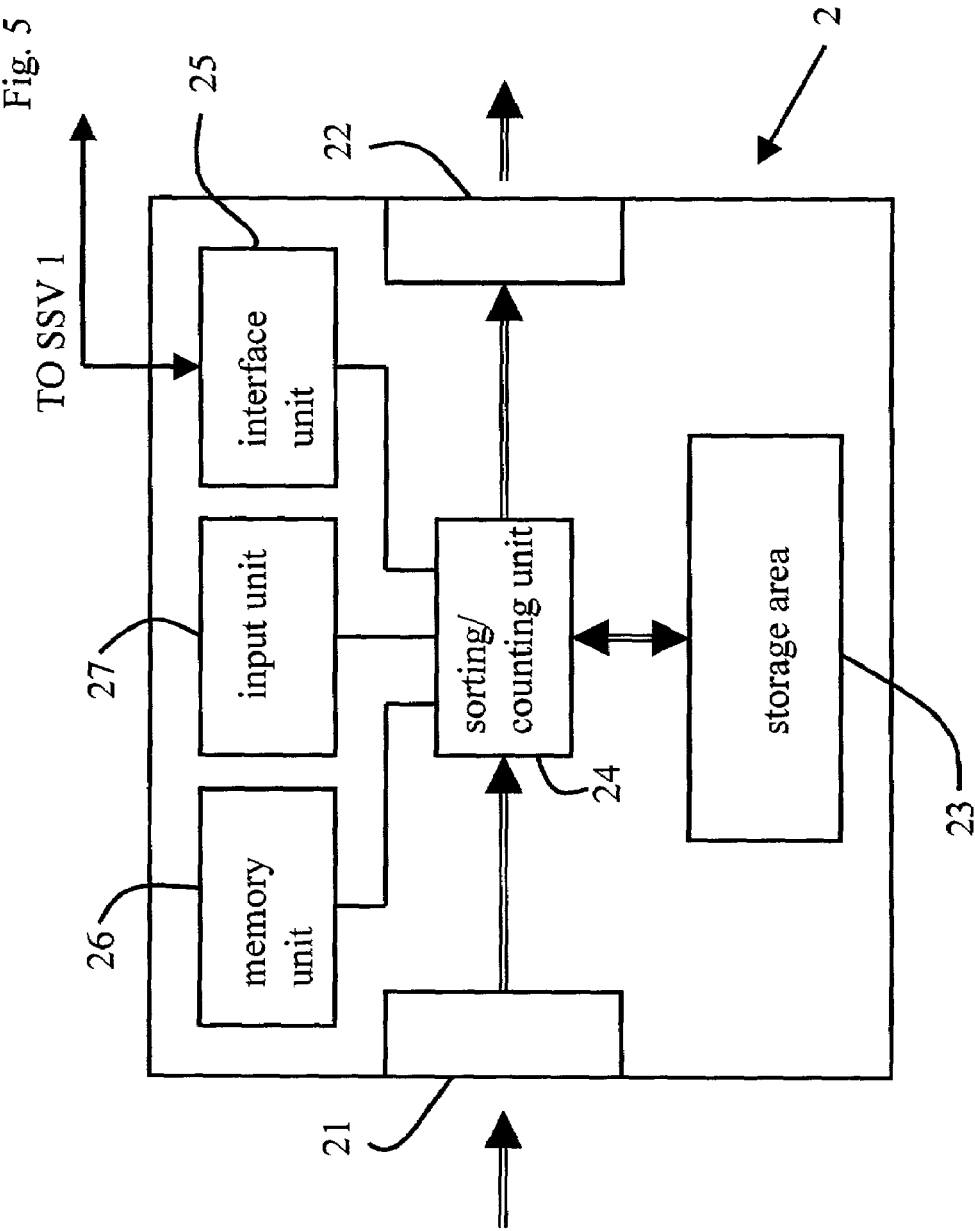
FIG. 5 is a schematic diagram showing an example of cash counter of the present invention.

FIG. 5 shows a schematic diagram of cash counter 2. Cash counter 2 includes a storage unit 23 whose function is similar to that of TC 5a. This storage unit 23 can be used as a kind of safe. Cash counter 2 also includes a memory unit 26, interface unit 25 that is connected to SSV 1, sorting/counting unit 24, and an input unit 27 such as a keyboard which is capable of inputting a code for identifying a cashier, and an amount of cash.

When cash is placed into cash counter 2 from slot 21, cash counter 2 counts the amount of cash, and stores calculated amount of cash within drawer 4a, 4b, 4c to memory unit 26 corresponding to an inputted cashier identification code. Cash counter 2 then transmits such information to SSV 1 through interface unit 25. As similar to TC 5a, cash that cannot be counted or determined is rejected from dispenser 22.

Cash remaining within storage area 23 cash counter 2 or storage area 53 of TC 5a after business hour can be carried over to the next business day. By doing so, it would not be necessary for stores to take cash to the bank after each business day, and costs for preparing cash as explained above can be reduced.

Basically, in this embodiment, cash will be accepted within TC 5a, and gift certificates or other kinds of coupons than cash are accepted within drawers 4a when transactions are made. Cash may be accepted within drawers 4a also in some instances. The amount of gift certificates in drawer 4a can be input manually from a keyboard 27 of cash counter 2 or a keyboard 12 of POS terminal 3a with the identification code of the cashier who handles them. Further, cash counter 2 stores the input total amount of gift certificates to memory unit 26, and the total amount of gift certificates will be transmitted to SSV 1.

SSV 1 receives information regarding amount of cash from POS terminal 3 or cash counter 2, gathers this information and calculates total amount of cash (including gift certificates) handled by each cashier, or remains in each of POS terminal 3 or cash counter 2.

Theoretically, a total amount of cash handled by a cashier during a business day will be:

$A = B + C$, where

A: balance of all transactions by each cashier,
B: cash deviation for change machine, and
C: amount of cash/gift certificate in drawer.

"A" is an amount of cash (including gift certificates) expected to be handled by a cashier during transactions. In other words, "A" shows a theoretical difference of cash before and after transactions. This information is transmitted from POS terminal 3a to SSV 1.

"B" is an actual amount of cash that remains within a change machine. In other words, "B" is the difference between cash actually received from customers that is accepted by TC 5a, and change actually given to customers in a period a particular cashier is in charge. This information will be transmitted from POS terminal 3a to SSV 1.

"C" is an actual amount of gift certificate (may include cash that is not accepted by TC 5a) received from customer and remains in drawer. This information will be transmitted either from POS terminal 3a or cash counter 2 to SSV 1.

As total amount of products purchased by customer can be calculated by POS terminal 3a, and an amount of cash received from customer can be determined through TC 5a or POS terminal 3a, the theoretical amount of "A" can be calculated by those information regarding transactions. On the other hand, the amount of "B" and "C" are the actual amounts of cash or gift certificates, and are determined by counting cash and gift certificates. Therefore, discrepancies in cash between a theoretical amount and an actual amount can be calculated by subtracting "A" from "B+C".

SSV 1 calculates current discrepancies in cash for each cashier according to these data transmitted from POS terminal 3a or cash counter 2. Current amount of cash-on-hand can be obtained from POS terminal 3a through TC 5a that is connected thereto.

An amount of cash-on-hand can be ascertained for each money type. An amount of cash-on-hand obtained from TC 5a is first sent to POS terminal 3a, then transmitted from a POS terminal 3a to SSV 1. SSV 1 relates transmitted cash-on-hand information to a POS terminal identification number and a cashier identification number, and stores these data in storage unit 14.

When a customer uses gift certificates, or coupons for payments, these certificates or coupons are not placed into TC 5a, assuming that TC 5a of the present embodiment is not capable of handling these coupons. Such gift certificates or coupons are put into drawer 4a. Similarly, money whose money type cannot be determined and rejected from TC 5a, as well as money that could not be accepted by TC 5a as happens when TC 5a is full, are put into drawer 4a.

Regarding cash accepted in drawer 4a, information such as money type information or it's amount can be entered by a cashier manually through keyboard 34 of POS terminal 3a, or by bringing drawer 4a to cash counter 2. In such case, amount of cash is so small that an operation for inputting this information will impose only a little burden on cashier.

A so-called "floating cashier" method is adopted in the POS system of the present embodiment. In this system, each cashier has his/her own drawer, and when a cashier uses POS terminal 3a, he/she sets his/her own drawer 4a into POS terminal 3a. When a cashier moves from one POS terminal 3a to another, cashier takes his/her drawer 4a from the first POS terminal 3a, and sets it into the other POS terminal 3b to which he/she is moving.

On the other hand, TC 5a is intrinsic to POS terminal 3a, and even if a cashier moves to the other POS terminal 3b, TC 5a does not move with the cashier, and cash within it remains as is. For this reason, the POS system of the present invention performs a process for ascertaining the increase/decrease amount of cash within TC while each cashier is working at each POS terminal.

Generally, SSV 1 has following functions.

First, SSV 1 performs price control for the POS terminal.

In the POS system shown in FIG. 1, a POS terminal 3a is equipped with a Price Lookup Table (PLU), recorded in memory unit 32, containing information regarding each product. During the settlement process, processor 31 searches the PLU by using product information such as recorded on a bar code and read by a bar code reader 36, and retrieves product information such as product name, price, etc. POS terminal 3a then performs calculation processes based on the retrieved information.

Here, it is necessary to perform PLU file maintenance when new product is added or removed, or price of a product is changed. Such PLU file maintenance is performed from SSV 1. In case sales take place, particularly in the case of supermarkets, special price data is created by SSV 1. When PLU file maintenance to be performed, an information inputted at SSV 1 is transmitted to POS terminal 3a. POS terminal 3a then update PLU based on received information.

Second, SSV 1 performs totaling of sales data.

Sales data for each transaction is transmitted from each POS terminal 3a, 3b, 3c to SSV 1. SSV 1 totals this sales data for each cashier.

Meanwhile, POS terminal 3a performs following functions, which are the same as those performed by conventional POS terminals.

1) Reading item information to be purchased by customer;
2) Calculating total amount of purchase for each transaction;
3) Printing receipt and journal for each transaction;
4) Transmitting transaction log to SSV 1; and
5) Totaling settlement information by each transaction.

Procedure of cash management performed by POS system of the present embodiment, shown in FIG. 1, will be described in detail.

First, the procedure performed by POS terminal 3a is described. As mentioned above, POS terminal 3a is equipped with drawer 4a and TC 5a. As previously mentioned, the input and output of cash (bills, coins) in the present embodiment is basically performed by TC5a, and gift certificates or other coupons are accepted by drawer 4a. Here, as explained above, drawer 4a moves together with the individual cashier when cashier moves from, or is replaced at, POS terminal 3a. On the other hand, TC 5a is intrinsic to POS terminal 3a.

Figure 6:
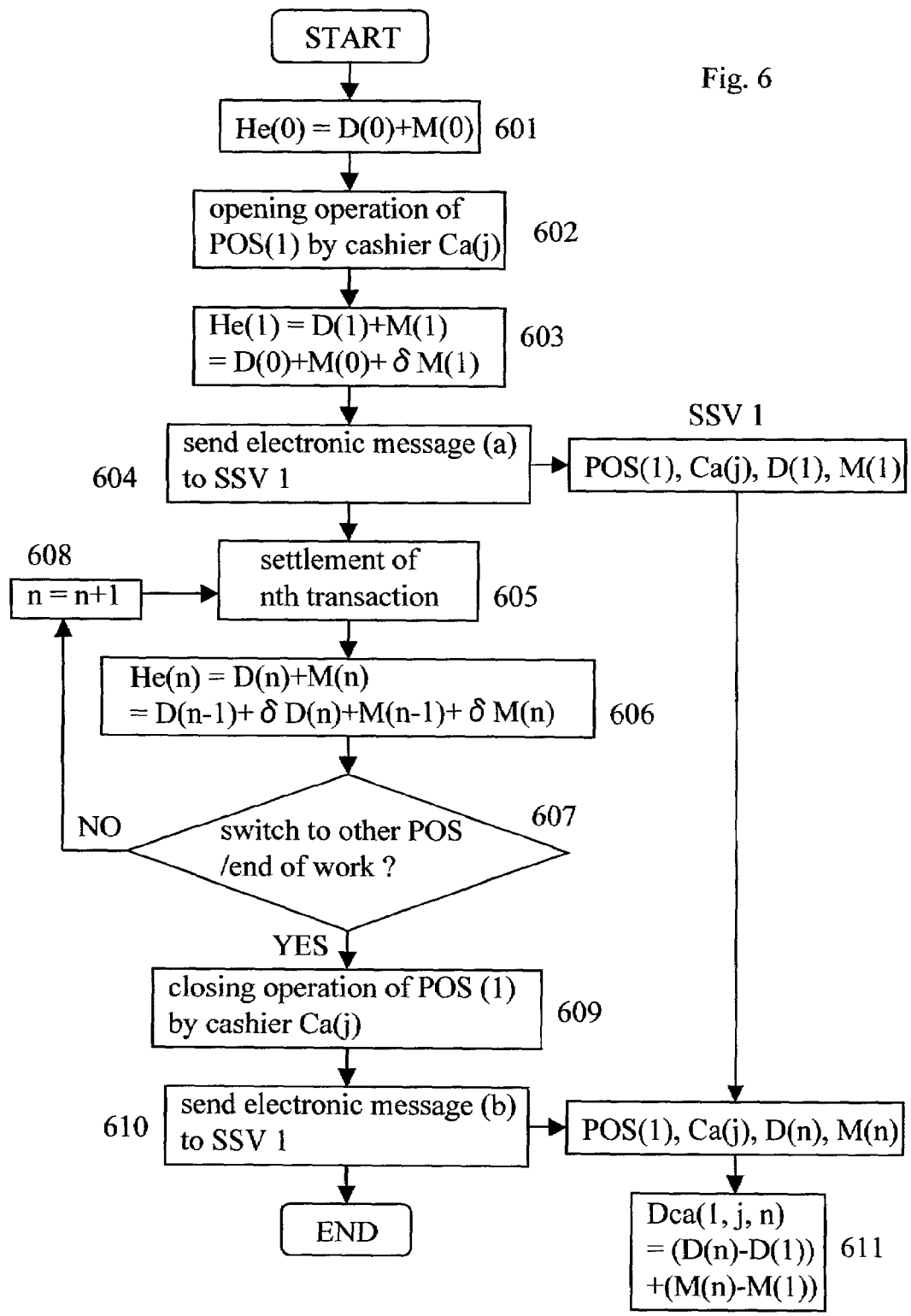
FIG. 6 is a flow chart showing process operated by point of sales terminal during transactions.

FIG. 6 shows a flow chart describing the operations processed by POS terminal 3a.

The amount of cash to be stored in storage area of POS terminal 3a, which includes drawer 4a and storage area of TC5a, before an operation is started is assumed to be HE(0). Similarly, the amount of gift certificates existing in drawer 4a before the register is opened is assumed to be D(0), and the amount of prepared cash in TC 5a brought over from the previous day is assumed to be M(0). As shown in 601 of FIG. 6, this situation is expressed as:

$$He(0)=D(0)+M(0),$$

where "0" signifies "prior to register opening".

This calculation is operated by each type of cash respectively. The same applies to calculations that are described hereafter.

Because gift certificates within drawer 4a are normally taken out at the end of work of the previous day, D(0) equals 0 in this situation. On the other hand, if cash has been stored, or is remaining, within TC 5a, M(0) equals the amount of cash existing in TC 5a at the time the register was closed on the previous day.

A register opening operation is performed in order for a cashier to start work (602). At this time, the cashier inserts cash prepared for change δM(1) (coins and bills) into TC 5a. TC 5a calculates amount of cash inserted and prepared for change δM(1) by money type.

Here, the amount of gift certificates in drawer 4a is D(1), which equals to 0, as no gift certificates exist at the time POS terminal is opened. Similarly, the amount of cash within TC 5$a$ (bills and coins) is M(1)=M(0)+δM(1). Therefore, amount of cash within POS terminal 3$a$ and TC 5$a$ at the opening operation will be:

$$He(1)=D(1)+M(1)=D(0)+M(0)+\delta M(1),$$

as shown in 603 of FIG. 6.

The number assigned to each symbol is a serial number related to each operation, assumed to be "1" at the opening of the register, and each time process is performed "1" will be added to that number. In addition, a "δ" attached to each symbol shows the increase/decrease in cash amount at the time of the operation.

Subsequent to the register opening operation, cashier registration is performed in POS terminal 3$a$. Here, a cashier number Ca(j) is input from a keyboard 34 or a card reader of POS terminal 3$a$ by the cashier him/herself to identify the cashier. Symbol "j" attached to the cashier number is a symbol intrinsic to each cashier.

An electronic message (a) in the form shown in FIG. 9 is transmitted from POS terminal 3$a$ to SSV 1, after cashier registration is done (604). The details of the various data in an electric message (a) are as followings:

1) POS(1): identification data of POS terminal 3$a$
2) Ca(j): cashier identification data
3) D(1): amount of gift certificates in drawer 4$a$
4) M(1): amount of cash in TC 5$a$ M(1) is sent from TC 5$a$ in response to a cash-on-hand report requested from POS terminal 3$a$. As stated previously, TC 5$a$ performs calculation of the amount of cash entered into, and disbursed from, TC 5$a$, and it is possible to calculate the amount of cash accepted by TC 5$a$ at that time based on the results of this calculation.

On the other hand, SSV 1 receives an electronic message from POS terminal 3$a$, and records its content into a total table that is produced within storage unit 14 of SSV 1.

The settlement processing of transactions using POS terminal 3$a$ is performed after such register opening operation is done.

Next, a settlement process will be described (605). This process is done when a customer purchases products.

First, the cashier scans a bar code attached onto product to be purchased by using a bar code reader. Based on read bar code data, the POS terminal refers to a PLU file, and product information corresponding to the product, such as product price, is retrieved from the PLU file. Then the retrieved information, such as product price or product name, is displayed on the display unit 35 of POS terminal 3$a$. Instead, product information or a price of a product can be entered manually by using keyboard 34, such in the case that a bar code cannot be read.

If all the products the customer wishes to purchase are registered, the cashier presses a calculating key set in POS terminal 3$a$. A total amount of purchased products is then calculated, and the cashier will handle the payment from the customer.

Next, cash received from the customer will be placed into TC 5$a$. If a gift certificate is used, the gift certificate is placed into drawer 4$a$, and an appropriate value of the gift certificate will be input manually from POS terminal 3$a$.

The amount of change to be discharged from TC 5$a$ is calculated by POS terminal 3$a$ based on total amount of product and an amount of cash/gift certificate received from customer. Change of the calculated amount is then discharged from TC 5$a$, and handed to the customer.

An amount of handled gift certificate is input through keyboard 34 of POS terminal, and an amount of cash inserted to TC 5$a$ by the cashier is automatically calculated by TC 5$a$, as TC 5$a$ has a sorting/counting unit 54. In the same way, with regard to the change disbursed, TC 5$a$ automatically calculates an amount of discharged money. Calculated amount of discharged change is sent and input to POS terminal 3$a$ after change being discharged from TC 5$a$. An amount of the increase or decrease δM(2) in TC 5$a$ is unambiguously determined from the cash amount inserted into and discharged from TC 5$a$. The handled money placed into TC5$a$ becomes supplemental change money as is. Thereafter each amount is calculated at this time, as:

$$D(2)=D(1)+\delta D(2), \text{ and}$$

$$M(2)=M(1)+\delta M(2), \text{ then}$$

$$He(2)=D(2)+M(2)=D(1)+\delta D(2)+M(1)+\delta M(2).$$

The amounts thus calculated are immediately send to and recorded in POS terminal 3$a$.

Subsequently, each time calculation processing is performed at the time of the nth transaction, the amounts:

$$D(n)=D(n-1)+\delta D(n)$$

$$M(n)=M(n-1)+\delta M(n)$$

$$He(n)=D(n)+M(n)=D(n-1)+\delta D(n)+M(n-1)+\delta M(n)$$

are calculated (606).

Thereafter, when a cashier switches to the other POS terminal or when ends work (607), processing/operation process is performed according to an operation by cashier Ca(j) at in order to end operation at POS terminal 3$a$ (609). The following data, with POS identification number POS(1) and cashier identification number Ca(j), is then transmitted from POS terminal 3$a$ to SSV 1 as an electronic message (b) in the form shown in FIG. 9 (610).

1) D(n): current amount of gift certificates in drawer 4$a$
2) M(n): current amount of cash in TC 5$a$ SSV 1 receives data form POS terminal 3$a$, and calculates the total of cash (theoretical amount) D a (l, j, n) that handled from the time cashier Ca(j) opened the register until transmission of the electronic message (b) as follows (611):

$$DCa(l, j, n)=(D(n)-D(1))+(M(n)-M(1)).$$

Number "1", which is a first digit in "DCa(l, j, n)" signifies the number identifying POS terminal 3$a$. Similarly, "j", a second digit, is the number for identifying cashier "j". Further, "n", a third digit, is a serial number, and will mean a final transaction in this case. SSV 1 records data received from POS terminal 3$a$ into total table in storage unit 14.

Figure 7:
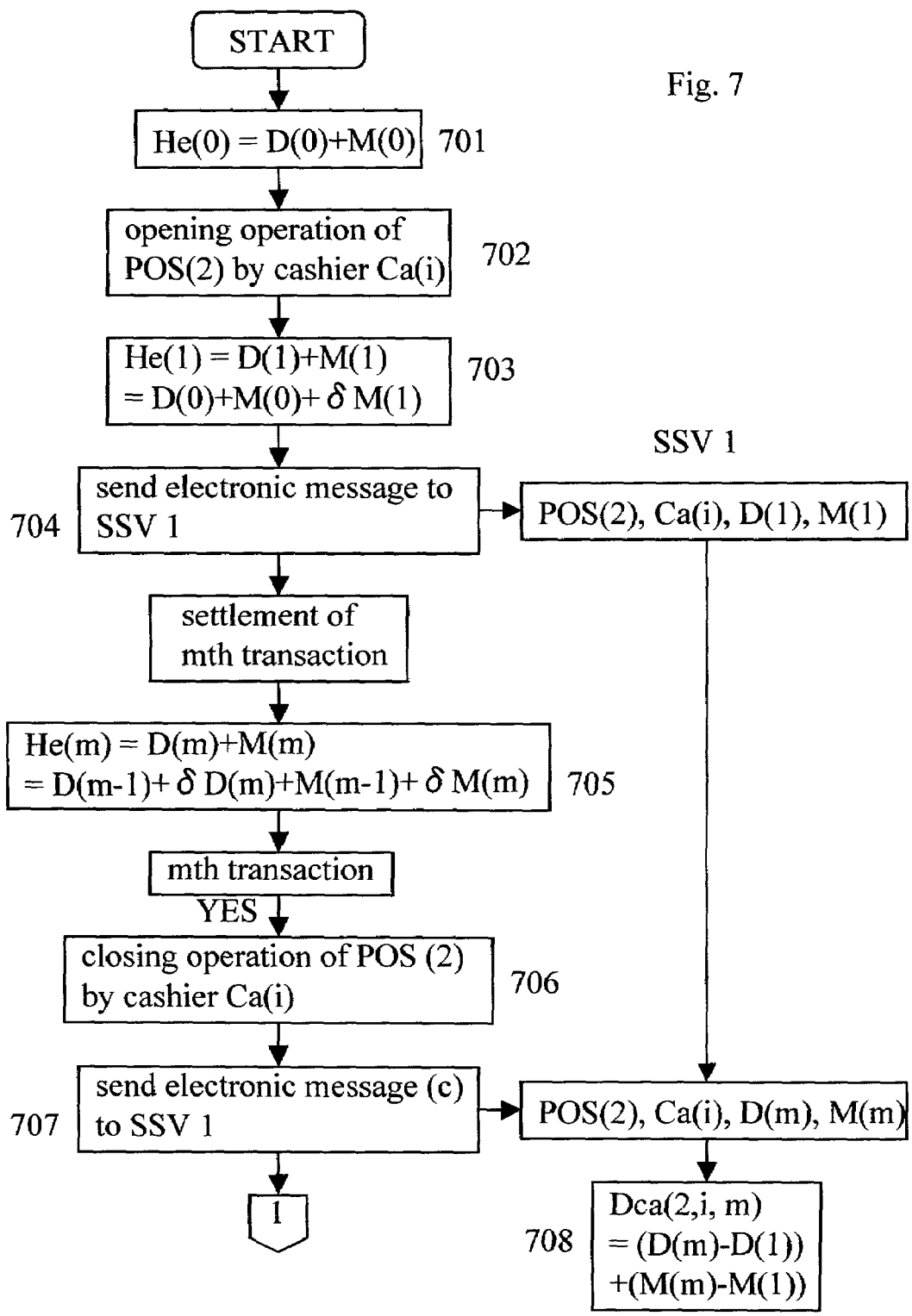
FIG. 7 is a flow chart showing process operated by the other point of sales terminal during transactions.
Figure 8:
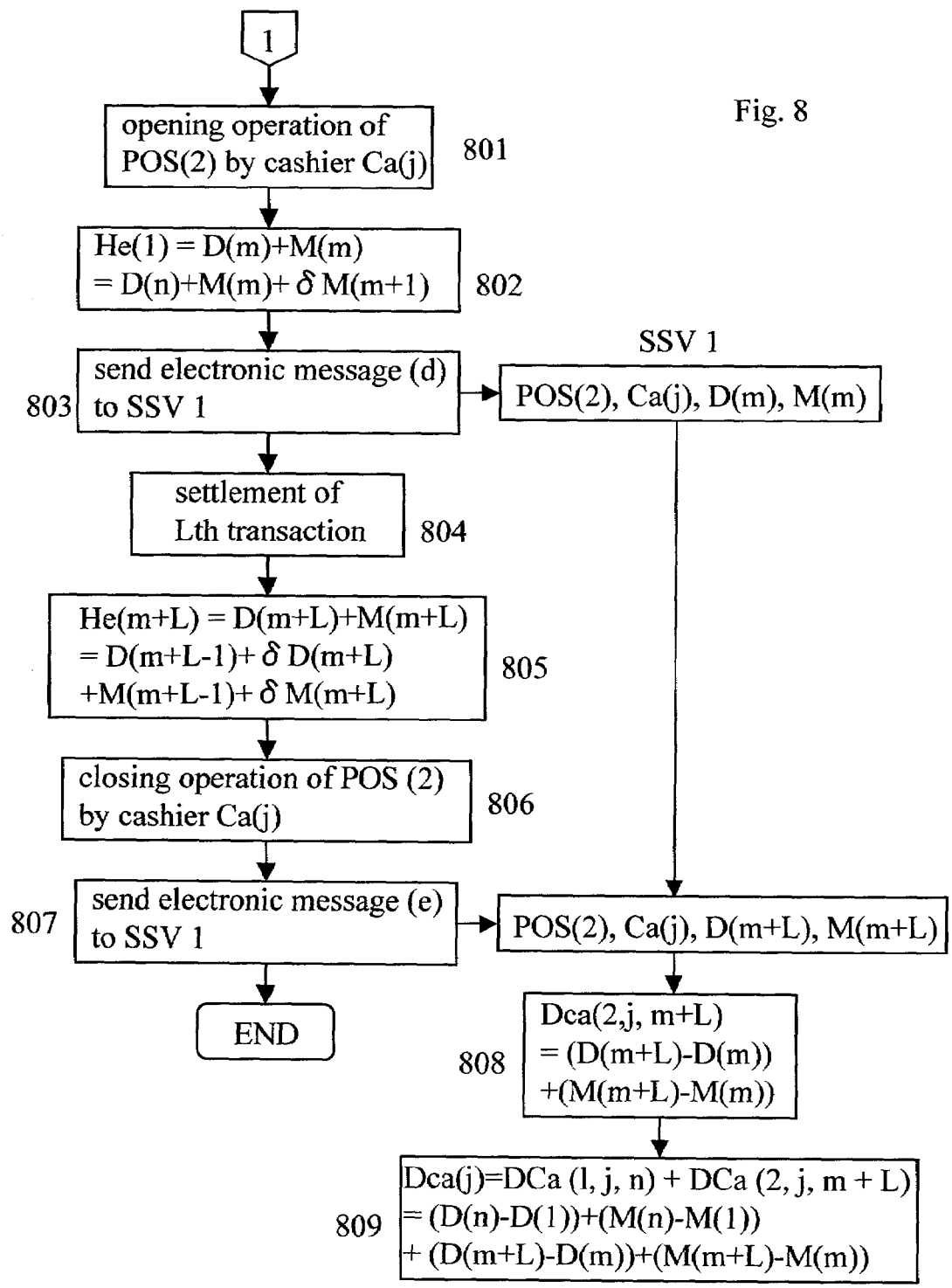
FIG. 8 is a flow chart showing process operated by the other point of sales terminal, which follows process described in FIG. 7.

FIG. 7 and FIG. 8 shows operations processed by the other POS terminal, namely POS terminal 3$b$. This POS terminal is numbered "POS(2)". As same as the case described in FIG. 6, at the beginning amount of cash with in POS terminal 3$b$ is $$He(0)=D(0)+M(0)$$

as shown in 701. When other cashier (i) opens POS terminal 3$b$ (702), amounts of cash or gift certificates regarding POS terminal 3$b$ will be $$He(1)=D(1)+M(1)=D(0)+M(0)+\delta M(1)$$

as shown in 703. Then POS terminal 3$b$ sends electronic message to SSV 1 (704). Similarly, amounts of cash or gift certificates regarding POS terminal 3$b$ at the end of the mth transaction is $$D(m)=D(m-1)+\delta D(m), \text{ and}$$

$$M(m)=D(m-1)+\delta D(m), \text{ hence}$$

$$He(m)=D(m)+M(m)=D(m-1)+\delta D(m)+D(m-1)+\delta D(m),$$

as shown in 705 of FIG. 7.

When a cashier is replaced at a point of m+1th transaction after opening of the register, cashier Ca(i) ends the operation on POS terminal 3b (706). Then an electric message (c) shown in FIG. 9 is transmitted from POS terminal 3b to SSV 1 (707), where:

1) D(m): current amount of gift certificates in drawer 4b, and

2) M(m): current amount of cash in TC 5b.

SSV 1 thereby calculates the total of cash or certificates (theoretical value) DCa(2, i, m) handled by cashier Ca(i) from the time cashier Ca(i) opened the register until receiving the electronic message (c) as:

$$DCa(2, i, m)=(D(m)-D(1))+(M(m)-M(1))$$

as shown in 708.

Next, a process when cashier Ca(j) starts to operate POS terminal 3b at the time cashier Ca(i) is replaced by cashier Ca(j) will be discussed. In this case, it is assumed that drawer 4a moves with cashier Ca(j) and is set into POS terminal 3b.

In this situation, cashier Ca(j) performs processing for starting operation at POS terminal 3b (801, FIG. 8). The amount of cash regarding POS terminal 3b is:

$$He(m+1)=D(m+1)+M(m+1)=D(n)+M(m)+\delta M(m+1).$$

At this time, the amount D(m+1) is replaced by the amount D(n), which is an amount of gift certificates that had existed up until then in drawer 4a that belongs to cashier (j). On the other hand, no change is made in M(m+1) as TC 5b is fixed to POS terminal 3b.

In combination with this operation, an electronic message (d) shown in FIG. 9 is transmitted from POS terminal 3b to SSV 1 (803), where;

1) D(m): amount of gift certificates in drawer 4a

2) M(m): amount of cash in TC 5b

After this process is done, cashier Ca(j) may perform settlement processing using POS terminal 3b, and amounts of cash or gift certificates will be calculated by each transaction as described above. The amount of cash or gift certificates from the time of cashier Ca(j) replacement until process L (means Lth process) is completed is calculated as:

$$D(m+L)=D(m+L-1)+\delta D(m+L) \text{ and}$$

$$M(m+L)=M(m+L-1)+\delta M(m+L), \text{ that means}$$

$$He(m+L)=D(m+L)+M(m+L)=D(m+L-1)+\delta D(m+L)+M(m+L-1)+\delta M(m+L),$$

as shown in 805.

Thereafter, when a cashier is replaced, or work is finished, cashier Ca(j) operates POS terminal 3b to finish the work in the same way as previously described (806). Then an electronic message (e) as shown in FIG. 9 is transmitted from POS terminal 3b to SSV 1 (807), where:

1) D(m+L): amount of gift certificates in drawer 4a

2) M(m+L): amount of cash in TC 5b.

SSV 1 thereby calculates DCa(2, j, m+L) (808), that is a theoretical total amount of cash (including gift certificates), handled in POS 3b from the time cashier Ca(j) moved to POS terminal 3b until he moves out, by:

$$DCa(2, j, m+L)=(D(m+L)-D(m))+(M(m+L)-M(m)).$$

Here, as cashier Ca(j) used both POS terminal 3a and POS terminal 3b, the total amount of cash handled by cashier Ca(j) is calculated as:

$$DCa(j)=DCa(l, j, n)+DCa(2, j, m+L)$$

as shown in 809. Such calculated total by each cashier will be recorded in totals table of SSV 1.

Figure 10:
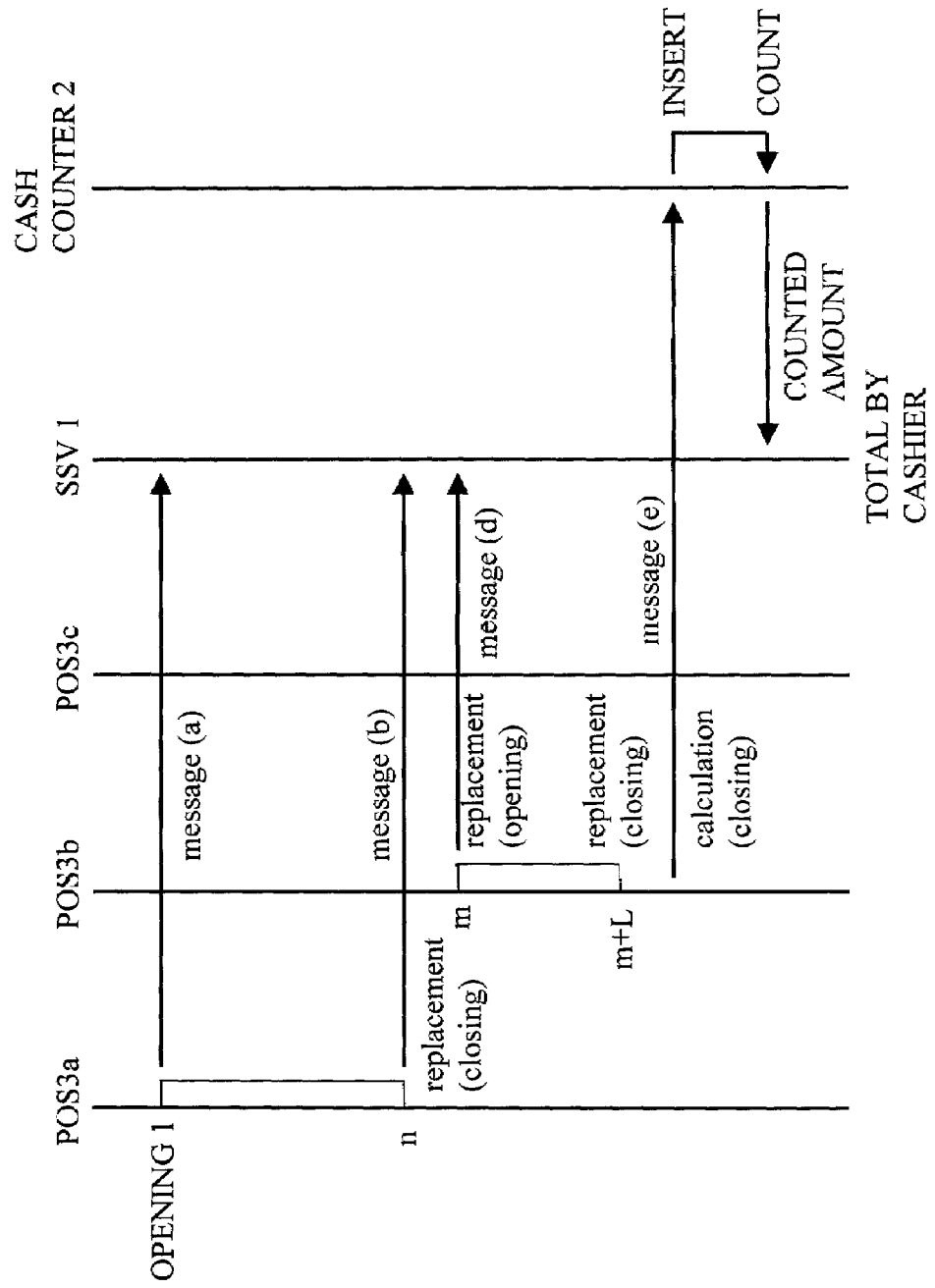
FIG. 10 is a flow chart showing data to be sent between point of sales terminal-store server-cash counter, according to an operation of a cashier.

FIG. 10 is a diagram showing the general flow of processes discussed above, and shows an example of a cashier Ca(j) being switched from POS terminal 3a to POS terminal 3b during business hours as described above.

Upon register opening process, an electronic message (a) is sent from POS terminal 3a to SSV 1. When a cashier is replaced from POS terminal 3a to POS terminal 3b, replacement (closing) message is first sent from POS terminal 3a to SSV 1 after a cashier operates a closing operation at POS terminal 3a. Then electronic message (b) is transmitted from POS terminal 3a to SSV 1. When cashier (j) operates opening operation at POS terminal 3b, replacement (opening) message is sent from POS terminal 3b to SSV 1. At this time an electronic message (d) is transmitted from POS terminal 3b to SSV 1.

When a cashier (j) finishes operation of POS terminal 3b, replacement (closing) and calculation (closing) messages are sent from POS terminal 3b to SSV 1, and electronic message (e) is transmitted from POS terminal 3b to SSV 1.

Although cash is basically not accepted into drawer 4a in the present embodiment, but only gift certificates, there are some circumstances where cash must be accepted in drawer 4a because cash cannot be accepted in TC 5a, such as TC 5a is full of cash.

In consideration of such unexpected circumstances, when cashier finishes operating POS terminal 3b, cashier brings the drawer 4a into cash counter 2. In this case, the cashier or the other staff places cash within the drawer 3a. The cashier Ca also inputs his or her identification number from a keyboard, or by using card reader. If any gift certificate is in the drawer 2, then an amount of the gift certificates is input manually.

Cash counter 2 counts an amount of cash placed into by each money type, and records the result of counting into a memory unit. Calculated amounts of money are transmitted with cashier identification number from cash counter 2 to SSV 1, and SSV 1 totals them by cashier. If cash has been accepted into the drawer 4a due to said unexpected circumstances, its amount is not determined until it is calculated by cash counter 2, as TC 5a does not count amount of those cash. However, the occurrence of such circumstances is rare. Normally, cash is managed almost entirely within TC 5a, so basically there will be no such difficulty occurs.

These actual amounts of cash and gift certificate send from the cash counter 2 to SSV 1 are compared with the theoretical amounts at the SSV 1, to determine a discrepancy between these two.

FIG. 11 shows example of a cash-on-hand table by money type at each in-store cash location.

The cash-on-hand table shows total amount of cash within each POS 3a–3n (that, TC 5a–5n), as well as number of each bills and coins by money type. Further, The cash-on-hand table shows amount of cash stored in cash counter 2.

A table shown in FIG. 11 may be printed, at the storage server for instance, or shown on a display device of POS terminal 3a or SSV 1. Further, FIG. 11 shows a cash-on-hand table created at register closing processing, such as at the stage where work ends at a store.

As shown in FIG. 11, cash-on-hand table records cash totals within each POS or cash counter, as well as number of bills accepted by each money type. Here, an appropriate number of bills to be accepted in drawer or TC at opening and closing for the following day by each money type is set to SSV 1 beforehand. This appropriate number is produced from experience of what sort of money is being handled from customers during the store's business hours, and what is being given out as change, and is a proper value for a purpose of effective supplementation or reducing opportunities for removing money from circulation.

A proper number of coins in the present embodiment is set at 50 pieces for 500 yen coins, and at 100 pieces for other coins. Similarly, a proper number for bills is set at 100 for 1,000 yen bills, and 20 for 5,000 yen bills. Furthermore, because there is no possibility of 10,000 yen bills being disbursed as change, no proper number is set for 10,000 yen bills.

Shortfalls of bills in TC receptor by each money type is printed along with the cash-on-hand on the cash-on-hand table shown in FIG. 11. In FIG. 11, numbers in upper half of each column show number of coins and bills in TC 5a–5n, and numbers in lower half of each column show number of coins and bills that supplement is needed. For example, TC 5a (POS terminal 3a) has 73 pieces of 100 yen coins, and 27 pieces (=100−73) of 100 yen coins has to be supplemented.

In this way, it is easy for employees to ascertain which TC/POS terminal should be supplemented with how much of, and what kind of coins or bills before start working on the next day, and making it possible to efficiently perform change preparation work prior to store opening.

In example of FIG. 11, information regarding cash-on-hand is sent from POS terminal to SSV 1 when closing process is done, but various types of cash information as described above may be transmitted from POS terminal 3a to SSV 1, at any time. Such information is transmitted at the end of each transaction, for example, and appropriate updates to the cash-on-had table are performed upon receipt of each electronic message. By appropriately updating the cash-on-hand table, it becomes easy to ascertain the cash-on-hand state of each POS terminal at any point in time by making it possible to reference the cash-on-hand table as needed. It thereby becomes possible to efficiently perform change supplementation and removal of large denominational bills from circulation.

SSV 1 receives the cash-on-hand information, the electronic message shown in FIG. 9, sent from each POS terminal in order to determine the supplementation/removal form circulation of money within TC. Conversely, it is also permissible to perform a cash-on-hand query of POS terminal or TC from SSV 1, and to transmit a response from POS terminal or TC to SSV1. It is thereby possible to ascertain on SSV 1 side whether change needs to be supplemented or cash taken out of circulation in POS terminal or TC.

FIG. 12 shows a table containing total amount of cash and gift certificates. The table shown in FIG. 12 contains information regarding cashier number, theoretical amount of cash to be within the change machine that is handled by each cashier, an actual amount of cash within the drawer, and an actual amount of gift certificates within the drawer. The table shown in FIG. 12 is used to determine a discrepancy between a theoretical amount of cash and an actual amount of cash.

Figure 13:
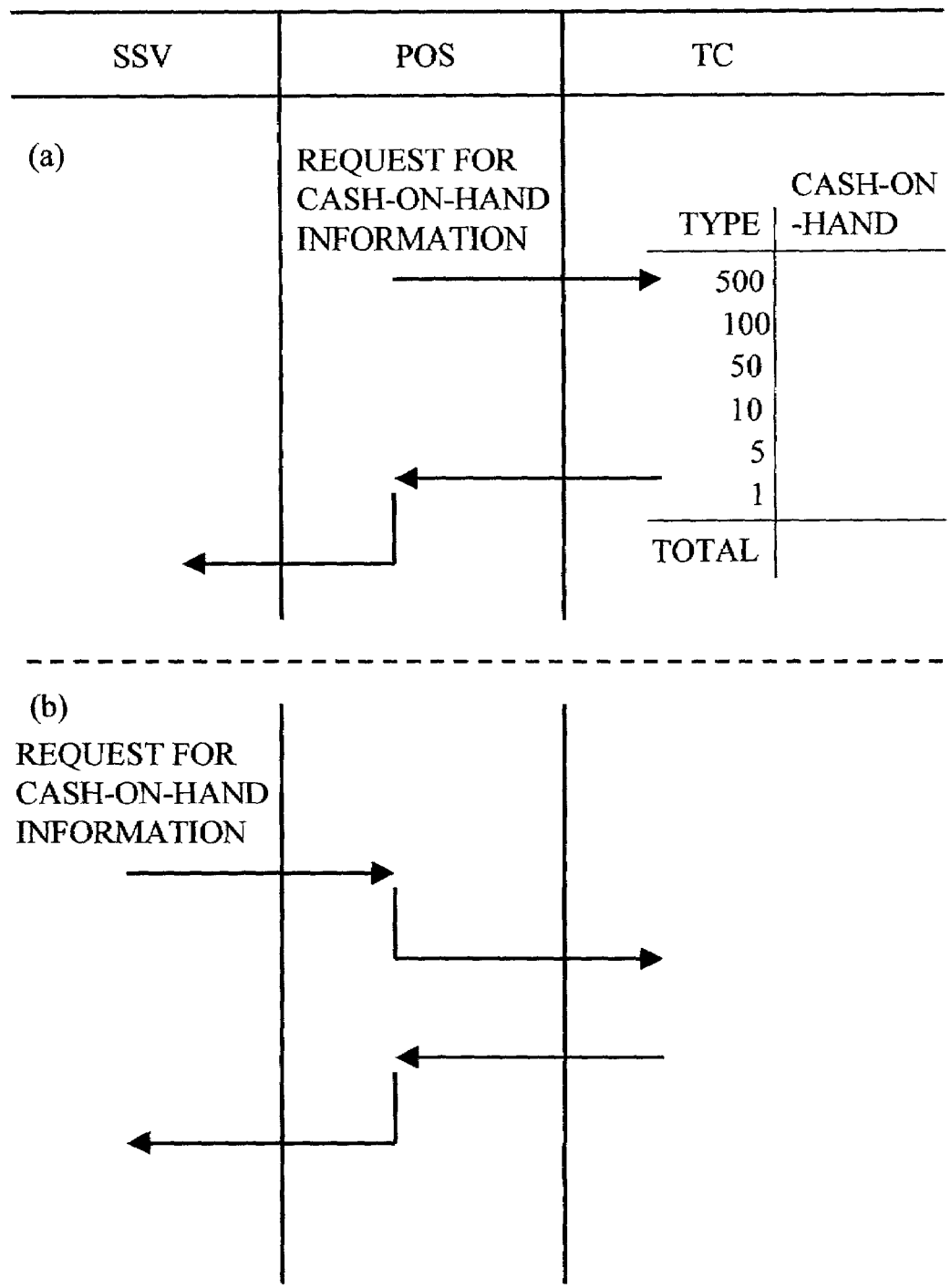
FIG. 13 is a flow chart showing cash-on-hand data flow between store server-point of sales terminal-terminal controller.

FIG. 13 shows a diagram describing a temporal sequence of operations described above.

The case of FIG. 13(a) describes an example that POS terminal actively sends cash-on-hand messages to SSV 1. In this case, POS terminal queries cash-on-hand information to TC before transmitting cash-on-hand information to SSV 1. In response to the queries, TC calculates cash-on-hand accepted within it by each money type, and relays the calculation results to POS terminal. TC 5a may calculates amount of cash within TC every time transaction occurs, and may memorize calculated amount. If TC memorizes the amount, then TC may not need to calculate the amount of cash at the time TC receives queries from POS terminal.

After receiving a reply from TC, then POS terminal will send information received from TC to SSV 1. It is thereby possible for SSV 1 to ascertain the cash-on-hand for each POS terminal.

FIG. 13(b) shows an example that SSV 1 sends a query to POS terminal. In this case, a cash-on-hand report request is transmitted from SSV 1 to POS terminal. In response to this request, POS terminal queries TC for a cash-on-hand report, as same as the case of FIG. 13(a). After that, a cash-on-hand information is reported from TC to POS terminal, also as same as the case of FIG. 13(a), and the result is reported to SSV 1.

In either example in FIG. 13(a) or FIG. 13(b), SSV 1 determines whether or not to supplement change to, or remove cash from POS terminal, after receiving the report.

As discussed above, the present invention, it is no longer necessary for the cashier operating each POS to ascertain the cash-on-hand in each individual POS terminal/change machine, and makes it possible to decrease cashier workload as well as cashier mistakes.

In addition, because it becomes possible to store the money prepared for change as is at store closing, it is thereby possible to restrict the necessity for transporting money prepared for change from a financial institution at store opening, and the taking of cash to a financial institution at store closing to a minimum.

Furthermore, it also makes possible reductions in deposits of money prepared beforehand for cash into a financial institution, and various fees that must be paid to the financial institution, as well as reducing labor costs for employees, etc.

The amount of cash received from customers can be manually input by cashier from keyboard of POS terminal. In such case, cash received from customers could be thrown into drawer instead of TC, as described above. In any case, actual amount of cash received from customers should be input, in any method, to calculate an appropriate amount of change to be handed to the customers, and to be discharged change from TC.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What we claim is:

1. A point of sales terminal, comprising:
 a programmable computer processor;
 an interface unit coupled to said processor, and communicating with an upper level device;

a memory unit coupled to said processor;
an input device coupled to said processor and inputting information;
a display unit coupled to said processor;
a change device storing cash for change and discharging an appropriate amount of change,
wherein said processor controls the point of sales terminal according to a process comprising:
  receiving information on current amount of change stored in the change device from said change device based upon an amount of cash discharged as change from the change device,
  calculating a discrepancy based on said information on current amount of change stored in the change device and information on a preliminarily set appropriate amount of change to be in the change device, and notifying the discrepancy.

2. A point of sales terminal comprising:
a programmable computer processor;
an interface unit coupled to said processor and communicating with an upper level device;
a memory unit coupled to said processor;
an input unit coupled to said processor for inputting information;
a display unit coupled to said processor; and
a change unit accepting cash received from a customer and discharging an appropriate amount of cash as change to be handed to the customer, including a storage area for storing cash that is prepared for change, and a unit counting amount of cash by each money type;
wherein said programmable computer processor controls the point of sales terminal according to a processing comprising:
  receiving cash-on-hand information from the change unit, and
  calculating cash-on-hand discrepancy information based on said cash-on-hand information and a preliminary set cash-on-hand information, and transmitting the calculated discrepancy to said upper level device.

3. The point of sales terminal according to claim 2, wherein said processor calculates and sends said discrepancy each time a transaction is completed.

4. The point of sales terminal according to claim 2 wherein an amount of cash that is not accepted by said change unit, or coupons that cannot be accepted by said change unit, is input from said input unit by a cashier, and a discrepancy of coupons before and after a transaction is completed is calculated by said processor.

5. The point of sales terminal according to claim 2, wherein said processor requests said change unit to send cash-on-hand information, and sends the information to said upper level terminal when a request from said upper level device is received.

6. The point of sales terminal according to claim 2, wherein said processor receives information regarding cash-on-hand table from said upper level device, and received cash-on-hand table is displayed on said display unit.

7. An information device in which at least one terminal is connected thereto, comprising:

a programmable computer processor;
an interface unit to communicate with said terminal; and
a memory unit to store a cash-on-hand table in which cash-on-hand information of each terminal is recorded, wherein said processor updates said cash-on-hand table according to cash-on-hand discrepancy information calculated and received from each terminal based upon cash-on-hand information of a terminal and a predetermined cash-on-hand information.

8. The information device according to claim 7, further comprising means for outputting said cash-on-hand table.

9. The information device according to claim 8, wherein said outputted cash-on-hand table contains information regarding amount of cash remaining in each terminal, and an amount of cash needs to be supplemented to fulfill a basic amount, by each of money type.

10. A method of managing cash-on-hand comprising:
recording, by each type, at least a difference between an amount of cash on hand, and amount of cash discharged everytime a transaction is completed;
accumulating said difference of one transaction with difference of cash of the previous transactions to calculate a difference between amount of cash within a terminal and a basic amount of cash that has to be in said terminal, as a calculated cash-on-hand difference;
outputting, upon request, said calculated cash-on-hand difference; and reporting the calculated cash-on-hand difference by each terminal to an upper device with an identifying information of each terminal.

11. The method of managing cash-on-hand according to claim 10, wherein said calculation of said cash-on-hand difference is operated every time a transaction is completed.

12. The method of managing cash-on-hand according to claim 10, wherein said calculation of said cash-on-hand difference is operated when a request for such calculation is received from outside.

13. The device according to claim 12, wherein said other device is a point of sales terminal.

14. A device capable of handling change to be given to customers, comprising:
a storage storing cash prepared for change;
a sorter determining types of cash thrown into said device, and sorting said cash by determined types;
a counter counting cash thrown into and discharged from said device by each types;
a memory unit storing at least a difference between amount of cash thrown into and discharged from said device by each type, as cash-on-hand information; and
an interface unit to be connected to another device;
wherein the cash-on-hand information recorded in said memory unit is sent to said another device through said interface unit to calculate by said another device a discrepancy based upon the cash-on-hand information and a predetermined cash-on-hand information.

15. The device according to claim 14, wherein, said cash-on-hand information recorded in said memory unit is output when said device receives a request from said another device.

* * * * *

UNITED STATES PATENT AND TRADEMARK OFFICE
CERTIFICATE OF CORRECTION

PATENT NO. : 6,981,633 B2  Page 1 of 1
APPLICATION NO. : 09/947533
DATED : January 3, 2006
INVENTOR(S) : Kaoru Inoue et al.

It is certified that error appears in the above-identified patent and that said Letters Patent is hereby corrected as shown below:

title Page, item [54] and: Column 1 (Title), Line 3, delete "CASH-ON HAND" and insert - - CASH-ON-HAND - - therefor.
First Page, Column 2, (Primary Examiner), Line 1, delete "Richard Chilcot" and insert - - Richard E. Chilcot, Jr. - - therefor.
Column 15, Line 45, after "claim 2" insert - - , - -.
Column 16, Line 17, after "cash-on-hand" insert - - , - -.
Column 16, Line 19, delete "cash on hand" and insert - - cash-on-hand - - therefor.

Signed and Sealed this

Fifteenth Day of August, 2006

JON W. DUDAS
*Director of the United States Patent and Trademark Office*